(12) United States Patent
Nagasawa et al.

(10) Patent No.: US 11,869,540 B2
(45) Date of Patent: Jan. 9, 2024

(54) MAGNETIC HEAD AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Tazumi Nagasawa, Yokohama (JP); Yuji Nakagawa, Kawasaki (JP); Naoyuki Narita, Funabashi (JP); Masayuki Takagishi, Kunitachi (JP); Tomoyuki Maeda, Kawasaki (JP); Ryo Osamura, Kawasaki (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/884,623

(22) Filed: Aug. 10, 2022

(65) Prior Publication Data
US 2023/0267961 A1    Aug. 24, 2023

(30) Foreign Application Priority Data
Feb. 21, 2022   (JP) ................. 2022-024470

(51) Int. Cl.
*G11B 21/02* (2006.01)
*G11B 5/31* (2006.01)
*G11B 5/21* (2006.01)

(52) U.S. Cl.
CPC ................ *G11B 21/02* (2013.01); *G11B 5/21* (2013.01); *G11B 5/3146* (2013.01)

(58) Field of Classification Search
None
See application file for complete search history.

(56) References Cited

U.S. PATENT DOCUMENTS 8,203,389 B1 *  6/2012  Zhou .................... H03B 15/006
                                                    365/158
8,264,799 B2 *  9/2012  Akiyama ................. G11B 5/02
                                                    360/324.1

(Continued)

FOREIGN PATENT DOCUMENTS

CN     101295508 A  * 10/2008  ............... G11B 5/02
JP     2020-149738 A     9/2020
(Continued)

*Primary Examiner* — William J Klimowicz
(74) *Attorney, Agent, or Firm* — Oblon, McClelland, Maier & Neustadt, L.L.P.

(57) ABSTRACT

According to one embodiment, a magnetic head includes first and second magnetic poles, a stacked body, and first to third terminals. The stacked body is provided between the first and second magnetic poles. The stacked body includes a first magnetic layer, a second magnetic layer between the first magnetic layer and the second magnetic pole, a third magnetic layer between the second magnetic layer and the second magnetic pole, a fourth magnetic layer between the third magnetic layer and the second magnetic pole, a first nonmagnetic layer between the first magnetic pole and the first magnetic layer, a second nonmagnetic layer between the first and second magnetic layers, a third nonmagnetic layer between the second and third magnetic layers, a fourth nonmagnetic layer between the third and fourth magnetic layers and a fifth nonmagnetic layer between the fourth magnetic layer and the second magnetic pole.

21 Claims, 11 Drawing Sheets

(56) References Cited

U.S. PATENT DOCUMENTS

| | | | | |
|---|---|---|---|---|
| 8,320,080 B1* | 11/2012 | Braganca | ............ | H01F 10/3254 360/125.71 |
| 8,379,352 B1* | 2/2013 | Braganca | ........... | G01R 33/1284 365/171 |
| 10,424,326 B1* | 9/2019 | Chen | ..................... | G11B 5/3133 |
| 10,522,174 B1* | 12/2019 | Chen | ..................... | G11B 5/1278 |
| 10,714,127 B1* | 7/2020 | Chen | ..................... | G11B 5/3116 |
| 10,714,132 B1* | 7/2020 | Chen | ..................... | G11B 5/4826 |
| 11,043,234 B2 | 6/2021 | Wu | | |
| 11,636,874 B1* | 4/2023 | Tang | ..................... | G11B 5/3146 360/313 |
| 2008/0019040 A1* | 1/2008 | Zhu | ........................ | B82Y 10/00 360/110 |
| 2008/0268291 A1* | 10/2008 | Akiyama | ............. | G11B 5/1278 428/800 |
| 2009/0080106 A1* | 3/2009 | Shimizu | ................. | G11B 5/314 360/75 |
| 2013/0070367 A1* | 3/2013 | Igarashi | ............... | G11B 5/1278 360/75 |
| 2013/0120875 A1* | 5/2013 | Suto | ..................... | G11B 5/3146 360/123.01 |
| 2016/0218728 A1* | 7/2016 | Zhu | ........................ | G11B 5/235 |
| 2020/0294537 A1 | 9/2020 | Nagasawa et al. | | |
| 2021/0056987 A1* | 2/2021 | Wu | ........................ | G11B 5/3146 |
| 2022/0270640 A1* | 8/2022 | Nakagawa | ........... | G11B 5/1877 |
| 2022/0270641 A1 | 8/2022 | Nakagawa et al. | | |
| 2023/0125878 A1* | 4/2023 | Tang | ........................ | G11B 5/11 360/123.12 |
| 2023/0131758 A1* | 4/2023 | Tang | .................... | G11B 5/3133 360/313 |
| 2023/0178102 A1 | 6/2023 | Nakagawa et al. | | |

FOREIGN PATENT DOCUMENTS

| | | |
|---|---|---|
| JP | 2022-129730 A | 9/2022 |
| JP | 2023-83663 A | 6/2023 |

* cited by examiner

MAGNETIC HEAD AND MAGNETIC RECORDING DEVICE

CROSS-REFERENCE TO RELATED APPLICATIONS

This application is based upon and claims the benefit of priority from Japanese Patent Application No. 2022-024470, filed on Feb. 21, 2022; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the recording density in the magnetic head and the magnetic recording device.

DETAILED DESCRIPTION

Figure 1:
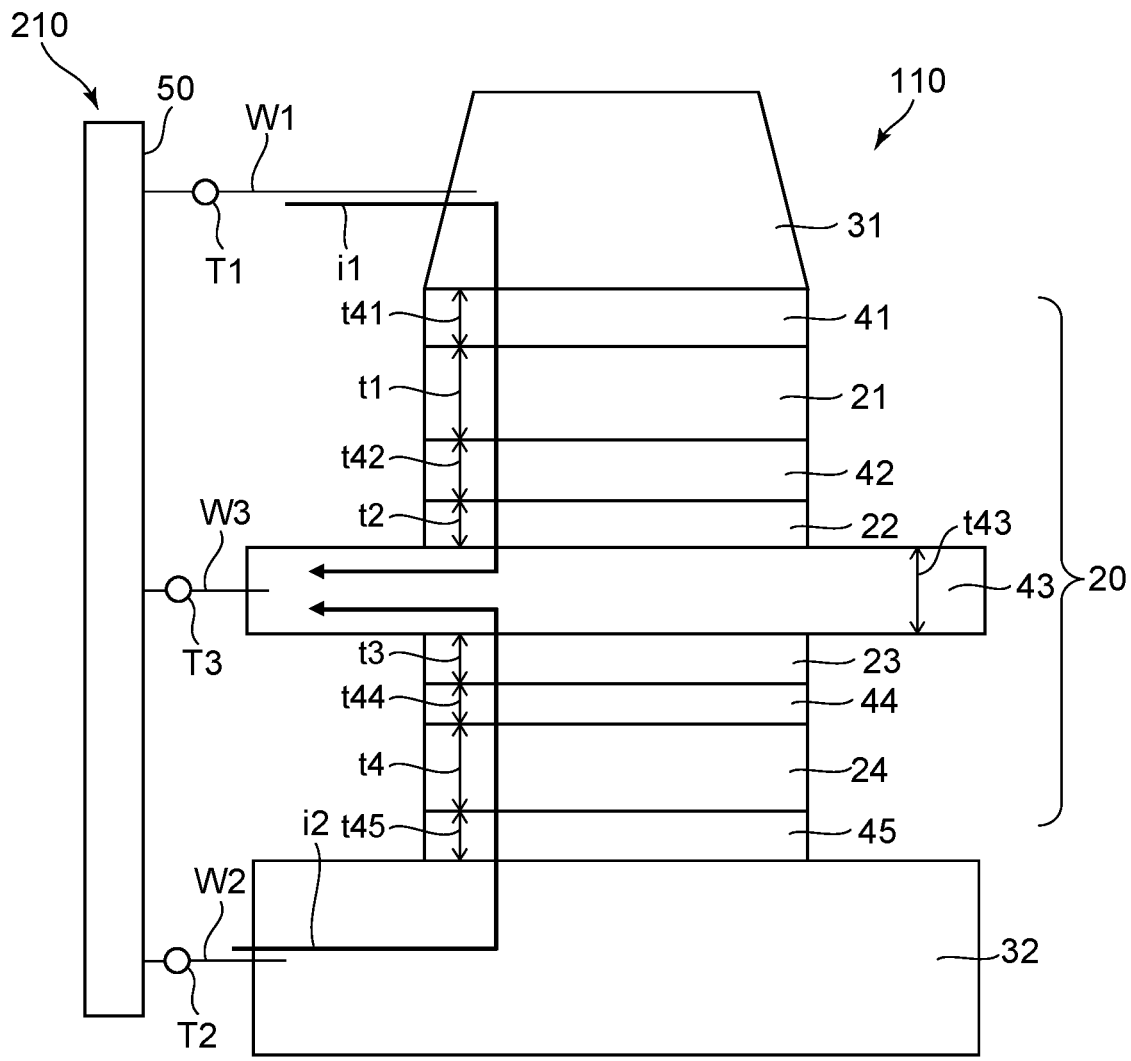
FIG. 1 is a schematic plan view illustrating a magnetic head according to a first embodiment.

According to one embodiment, a magnetic head includes a first magnetic pole, a second magnetic pole, a stacked body, a first terminal, a second terminal, and a third terminal. The stacked body is provided between the first magnetic pole and the second magnetic pole. The stacked body includes a first magnetic layer, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, a first nonmagnetic layer provided between the first magnetic pole and the first magnetic layer, a second nonmagnetic layer provided between the first magnetic layer and the second magnetic layer and being in contact with the first magnetic layer and the second magnetic layer, a third nonmagnetic layer provided between the second magnetic layer and the third magnetic layer, a fourth nonmagnetic layer provided between the third magnetic layer and the fourth magnetic layer and being in contact with the third magnetic layer and the fourth magnetic layer, and a fifth nonmagnetic layer provided between the fourth magnetic layer and the second magnetic pole. The first terminal is electrically connected to the first magnetic pole. The second terminal is electrically connected to the second magnetic pole. The third terminal is electrically connected to the third nonmagnetic layer.

According to one embodiment, a magnetic recording device includes the magnetic head described above, and a controller electrically connected to the first terminal, the second terminal, and the third terminal. The controller is configured to supply a first current from the first terminal to the third terminal and a second current from the second terminal to the third terminal to the magnetic head.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic plan view illustrating a magnetic head according to the first embodiment.

Figure 2:
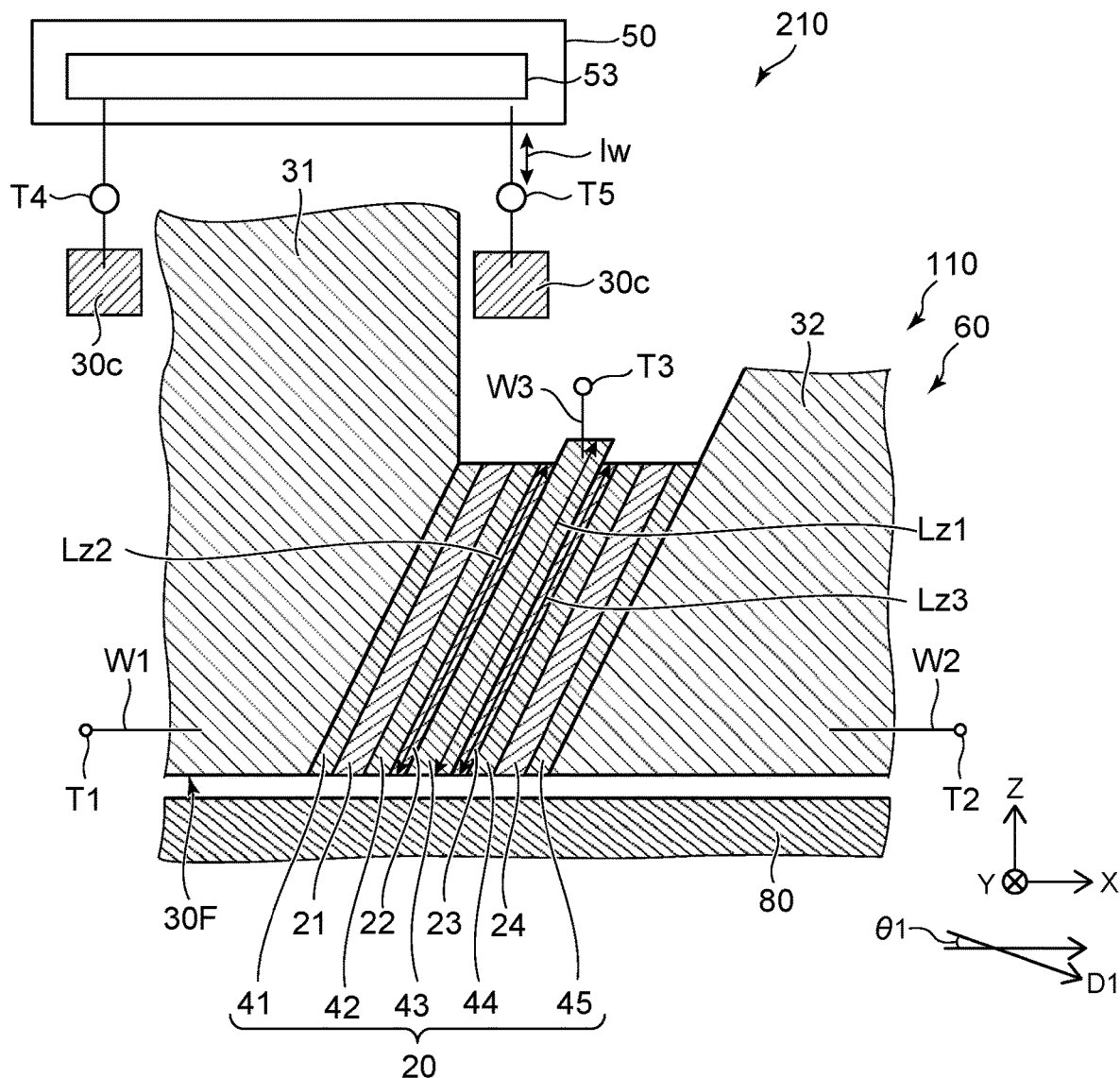
FIG. 2 is a schematic cross-sectional view illustrating the magnetic head according to the first embodiment.

FIG. 2 is a schematic cross-sectional view illustrating the magnetic head according to the first embodiment.

As shown in FIGS. 1 and 2, a magnetic head 110 according to the embodiment includes a first magnetic pole 31, a second magnetic pole 32, a stacked body 20, a first wiring W1, a second wiring W2, and a third wiring W3.

The stacked body 20 is provided between the first magnetic pole 31 and the second magnetic pole 32. The stacked body 20 includes a first magnetic layer 21, a second magnetic layer 22, a third magnetic layer 23 and a fourth magnetic layer 24, a first nonmagnetic layer 41, a second nonmagnetic layer 42, a third nonmagnetic layer 43, a fourth nonmagnetic layer 44, and the fifth nonmagnetic layer 45. The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32.

The first nonmagnetic layer 41 is provided between the first magnetic pole 31 and the first magnetic layer 21. The second nonmagnetic layer 42 is provided between the first magnetic layer 21 and the second magnetic layer 22, and is in contact with the first magnetic layer 21 and the second magnetic layer 22. The third nonmagnetic layer 43 is provided between the second magnetic layer 22 and the third magnetic layer 23. The fourth nonmagnetic layer 44 is provided between the third magnetic layer 23 and the fourth magnetic layer 24 and is in contact with the third magnetic layer 23 and the fourth magnetic layer 24. The fifth nonmagnetic layer 45 is provided between the fourth magnetic layer 24 and the second magnetic pole 32.

The first terminal T1 is electrically connected to the first magnetic pole 31. In this example, the first terminal T1 is electrically connected to the first magnetic pole 31 by a first wiring W1. The second terminal T2 is electrically connected to the second magnetic pole 32. In this example, the second terminal T2 is electrically connected to the second magnetic pole 32 by a second wiring W2. The third terminal T3 is electrically connected to the third nonmagnetic layer 43. In this example, the third terminal T3 is electrically connected to the third nonmagnetic layer 43 by a third wiring W3.

As shown in FIG. 2, the magnetic head 110 may include a coil 30c. The coil 30c faces at least a part of the first magnetic pole 31. The magnetic recording device 210 according to the embodiment includes, for example, the magnetic head 110, a controller 50, and a magnetic recording medium 80. The controller 50 may include a third circuit 53. The third circuit 53 is configured to supply a recording current Iw to the coil 30c. For example, a recording magnetic field corresponding to the recording current Iw is generated from the first magnetic pole 31. The recording magnetic field is applied to the magnetic recording medium 80. As a result, the magnetization of the magnetic recording medium 80 changes, and information is recorded.

The first magnetic pole 31, the second magnetic pole 32, and the stacked body 20 are included in the recording portion 60. As will be described later, the magnetic head 110 may be provided with a reproducing portion.

The first magnetic pole 31 is, for example, a main magnetic pole. The first magnetic pole 31 includes a medium facing surface 30F. The medium facing surface 30F is along the ABS (Air Bearing Surface) of the magnetic head 110. The medium facing surface 30F faces the magnetic recording medium 80.

A direction perpendicular to the medium facing surface 30F is a Z-axis direction. One direction perpendicular to the Z-axis direction is defined as an X-axis direction. The direction perpendicular to the Z-axis direction and the X-axis direction is defined as a Y-axis direction.

The Z-axis direction is, for example, the height direction. The X-axis direction is, for example, the down-track direction. The Y-axis direction is the cross-track direction.

The second magnetic pole 32 corresponds to, for example, a "trailing shield". The second magnetic pole 32 is, for example, an auxiliary magnetic pole. The second magnetic pole 32 can form a magnetic core together with the first magnetic pole 31. For example, additional shields such as side shields (not shown) may be provided.

As shown in FIGS. 1 and 2, a direction from the first magnetic layer 21 to the fourth magnetic layer 24 is defined as a first direction D1. As shown in FIG. 2, the first direction D1 is along the X-axis direction. The angle between the first direction D1 and the X-axis direction is smaller than the angle between the first direction D1 and the Z-axis direction, and smaller than the angle between the first direction D1 and the Y-axis direction. The first direction D1 may be inclined with respect to the X-axis direction.

As shown in FIG. 1, the first current i1 and the second current i2 can flow through the stacked body 20. The first current i1 is a current from the first magnetic pole 31 to the third nonmagnetic layer 43. The second current i2 is a current from the second magnetic pole 32 to the third nonmagnetic layer 43. These currents are supplied from the controller 50. The first current i1 flows in an orientation from the first terminal T1 to the third terminal T3. The second current i2 flows in an orientation from the second terminal T2 to the third terminal T3. The electron flow corresponding to the first current i1 flows from the third nonmagnetic layer 43 toward the first magnetic pole 31. The electron flow corresponding to the second current i2 flows from the third nonmagnetic layer 43 toward the second magnetic pole 32.

An alternating magnetic field (for example, a high frequency magnetic field) is generated from the stacked body 20 by such a first current i1 and a second current i2. The AC magnetic field generated by the stacked body 20 is applied to the magnetic recording medium 80, and writing to the magnetic recording medium 80 is assisted. For example, MAMR (Microwave Assisted Magnetic Recording) can be performed. The frequency of the alternating magnetic field is, for example, not less than 10 GHz and not more than 50 GHz. The frequency of the alternating magnetic field is, for example, preferably not less than 20 GHz and not more than 40 GHz.

The alternating magnetic field is based on, for example, an oscillation of the magnetization of the magnetic layer included in the stacked body 20. In the embodiment, high oscillation efficiency can be obtained. More effective MAMR can be performed. According to the embodiment, it is possible to provide a magnetic head capable of improving the recording density.

Figure 3:
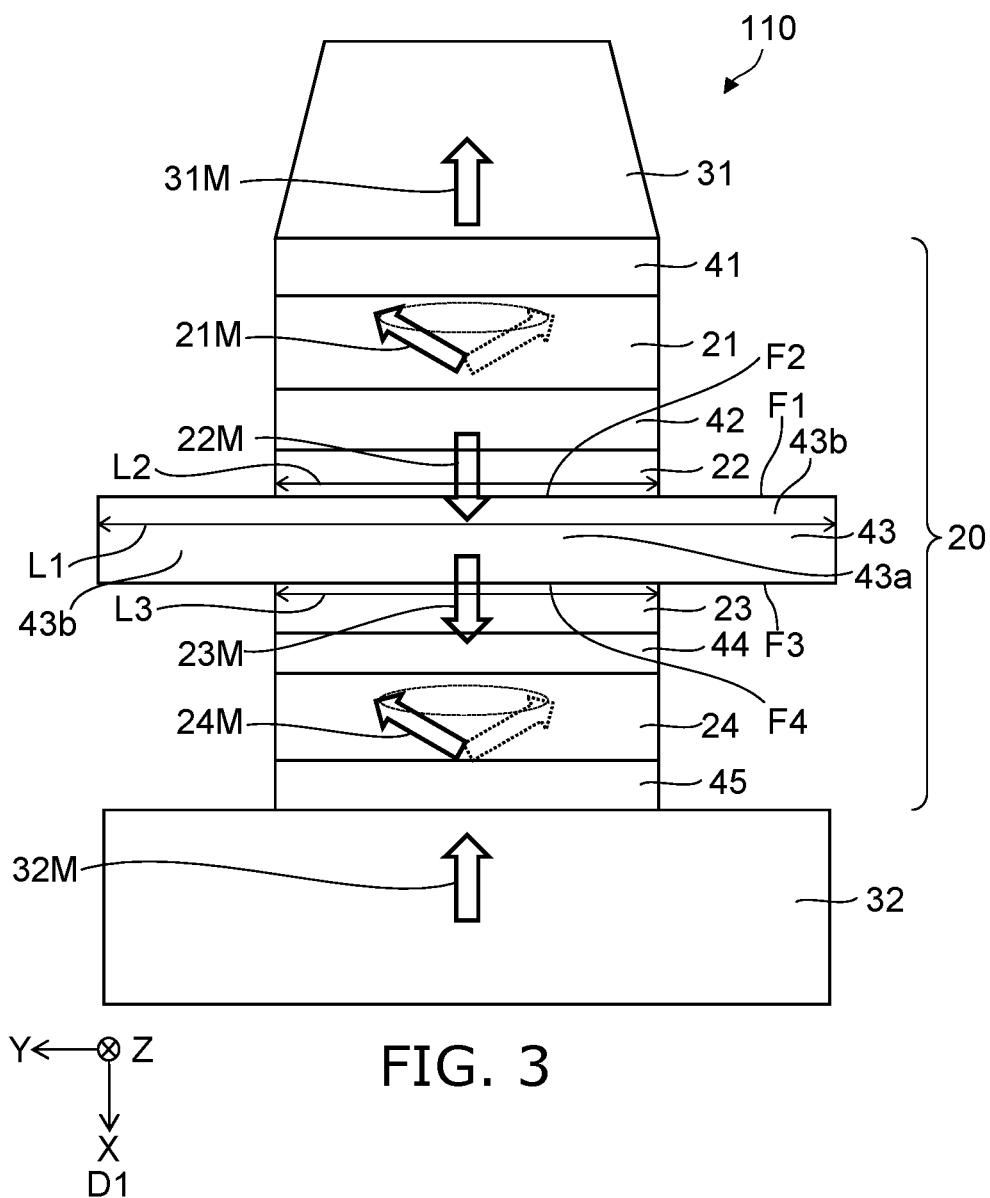
FIG. 3 is a schematic plan view illustrating the magnetic head according to the first embodiment.

FIG. 3 is a schematic plan view illustrating the magnetic head according to the first embodiment.

FIG. 3 shows an example of magnetization when the first current i1 and the second current i2 flow. As shown in FIG. 3, the orientation of the magnetization 32M of the second magnetic pole 32 is the same as the orientation of the magnetization 31M of the first magnetic pole 31. At this time, the magnetization 22M of the second magnetic layer 22 and the magnetization 23M of the third magnetic layer 23 are opposite to the magnetization 31M. The magnetization 21M of the first magnetic layer 21 and the magnetization 24M of the fourth magnetic layer 24 oscillate. An alternating magnetic field is generated with the oscillation.

For example, the first magnetic layer 21 and the fourth magnetic layer 24 function as an FGL (Field Generation Layer). For example, the second magnetic layer 22 and the third magnetic layer 23 function as a SIL (Spin Injection Layer).

In the embodiment, the spin torque from the first magnetic pole 31 and the spin torque from the second magnetic pole 32 can be used. As a result, oscillation is efficiently generated in the first magnetic layer 21 and the fourth magnetic layer 24.

In the embodiment, the orientation of the magnetization 22M of the second magnetic layer 22 is the same as the orientation of the magnetization 23M of the third magnetic layer 23. This makes it easy to stabilize these magnetizations.

As described above, the magnetization 22M of the second magnetic layer 22 and the magnetization 23M of the third magnetic layer 23 are opposite to the magnetization 31M. As a result, the recording magnetic field generated from the first magnetic pole 31 becomes difficult to pass through the stacked body 20. As a result, the recording magnetic field is applied to the magnetic recording medium more efficiently. Recording with higher efficiency becomes possible.

As shown in FIG. 1, in this example, the first nonmagnetic layer 41 is in contact with the first magnetic pole 31 and the first magnetic layer 21. The fifth nonmagnetic layer 45 is in contact with the fourth magnetic layer 24 and the second magnetic pole 32. As will be described later, another nonmagnetic layer may be provided between the first magnetic pole 31 and the first magnetic layer 21. As will be described later, another nonmagnetic layer may be provided between the fourth magnetic layer 24 and the second magnetic pole 32.

As shown in FIG. 1, a thickness of the first magnetic layer 21 along the first direction D1 (the direction from the first magnetic layer 21 to the fourth magnetic layer 24) is defined as a first thickness t1. A thickness of the second magnetic layer 22 along the first direction D1 is defined as a second thickness t2. A thickness of the third magnetic layer 23 along the first direction D1 is defined as a third thickness t3. A thickness of the fourth magnetic layer 24 along the first direction D1 is defined as a fourth thickness t4.

In the embodiment, it is preferable that the first thickness t1 is thicker than the second thickness t2 and thicker than the third thickness t3. The fourth thickness t4 is preferably thicker than the second thickness t2 and preferably thicker than the third thickness t3. By providing such a thickness relationship, the magnetization of the first magnetic layer 21 and the fourth magnetic layer 24 can oscillate more efficiently. By providing such a thickness relationship, the magnetization of the second magnetic layer 22 and the third magnetic layer 23 can be more effectively reversed.

For example, the first thickness t1 is preferably 1.1 times or more the second thickness t2, and preferably 1.1 times or more the third thickness t3. For example, the fourth thickness t4 is preferably 1.1 times or more the second thickness t2, and preferably 1.1 times or more the third thickness t3.

For example, the first thickness t1 is preferably not less than 5 nm and not more than 15 nm. The second thickness t2 is preferably not less than 1 nm and less than 5 nm. The third thickness t3 is preferably not less than 1 nm and less than 5 nm. The fourth thickness t4 is preferably not less than 5 nm and not more than 15 nm. When the first thickness t1 and the fourth thickness t4 are 5 nm or more, efficient oscillation can be easily obtained. When the first thickness t1 and the fourth thickness t4 are 15 nm or less, it is possible to suppress the thickness of the stacked body 20 from becoming excessively thick. When the second thickness t2 and the third thickness t3 are less than 5 nm, efficient magnetization reversal can be easily obtained. When the second thickness t2 and the third thickness t3 are 1 nm or more, efficient oscillation can be easily obtained.

The first magnetic layer 21, the second magnetic layer 22, the third magnetic layer 23, and the fourth magnetic layer 24 include, for example, at least one selected from the group consisting of Fe, Co, and Ni.

For example, at least one of the first nonmagnetic layer 41, the second nonmagnetic layer 42, the fourth nonmagnetic layer 44, or the fifth nonmagnetic layer 45 includes at least one selected from the group consisting of Cu, Au, Cr, Al, V, and Ag. For example, spin can be transferred efficiently.

For example, the third nonmagnetic layer 43 includes at least one selected from the group consisting of Ta, Pt, Ir, W, Mo, Cr, Tb, Rh, Pd and Ru. As a result, for example, the spin interaction between the second magnetic layer 22 and the third magnetic layer 23 becomes small. For example, stable oscillation becomes easy.

A thickness t41 of the first nonmagnetic layer 41 along the first direction D1 is preferably not less than 0.5 nm and not more than 5 nm. A thickness t42 of the second nonmagnetic layer 42 along the first direction D1 is preferably not less than 0.5 nm and note more than 5 nm. A thickness t43 of the third nonmagnetic layer 43 along the first direction D1 is preferably not less than 3 nm and not more than 15 nm. A thickness t44 of the fourth nonmagnetic layer 44 along the first direction D1 is preferably not less than 0.5 nm and not more than 5 nm. The thickness t45 of the fifth nonmagnetic layer 45 along the first direction D1 is preferably not less than 0.5 nm and not more than 5 nm.

As shown in FIG. 3, the size of the third nonmagnetic layer 43 may be larger than the size of the magnetic layer. For example, the third nonmagnetic layer 43 includes a first partial region 43a and a second partial region 43b. The first partial region 43a overlaps the second magnetic layer 22 in a facing direction (for example, the direction along the first direction D1) from the third nonmagnetic layer 43 to the second magnetic layer 22. The second partial region 43b does not overlap the second magnetic layer 22 in the facing direction. The first partial region 43a overlaps the fourth magnetic layer 24 in a facing direction (for example, the direction along the first direction D1) from the third nonmagnetic layer 43 to the fourth magnetic layer 24. The second partial region 43b does not overlap the fourth magnetic layer 24 in the facing direction.

As shown in FIG. 3, the third nonmagnetic layer 43 includes a first surface F1 facing the second magnetic layer 22. The second magnetic layer 22 includes a second surface F2 facing the third nonmagnetic layer 43. An area of the first surface F1 may be larger than an area of the second surface F2.

As shown in FIG. 3, the third nonmagnetic layer 43 includes a third surface F3 facing the third magnetic layer 23. The third magnetic layer 23 includes a fourth surface F4 facing the third nonmagnetic layer 43. An area of the third surface F3 is larger than an area of the fourth surface F4.

As shown in FIG. 3, a length of the third nonmagnetic layer 43 along a crossing direction is defined as a length L1. The crossing direction crosses the facing direction (for example, the direction along the first direction D1) from the third nonmagnetic layer 43 to the fourth magnetic layer 24. In FIG. 3, the crossing direction is the Y-axis direction. A length of the second magnetic layer 22 along the crossing direction (Y-axis direction) is defined as a length L2. A length of the third magnetic layer 23 along the crossing direction (Y-axis direction) is defined as a length L3. The length L1 is longer than the length L2 and longer than the length L3.

As described above, the size of the third nonmagnetic layer 43 may be larger than the size of the second magnetic layer 22 and may be larger than the size of the third magnetic layer 23. Thereby, for example, the density of the current flowing through the third nonmagnetic layer 43 can be reduced. For example, it becomes easy to operate stably.

As shown in FIG. 2, a length of the third nonmagnetic layer 43 along the crossing direction crossing the facing direction (for example, the direction along the first direction D1) from the third nonmagnetic layer 43 to the fourth magnetic layer 24 is defined as a length is Lz1. In FIG. 2, the crossing direction is perpendicular to the first direction D1. A length of the second magnetic layer 22 along the crossing direction is defined as a length Lz2. A length of the third magnetic layer 23 along the crossing direction is defined as a length Lz3. The length Lz1 may be longer than the length Lz2 and may be longer than the length Lz3.

Hereinafter, several examples of the magnetic head according to the embodiment will be described.

Figure 4:
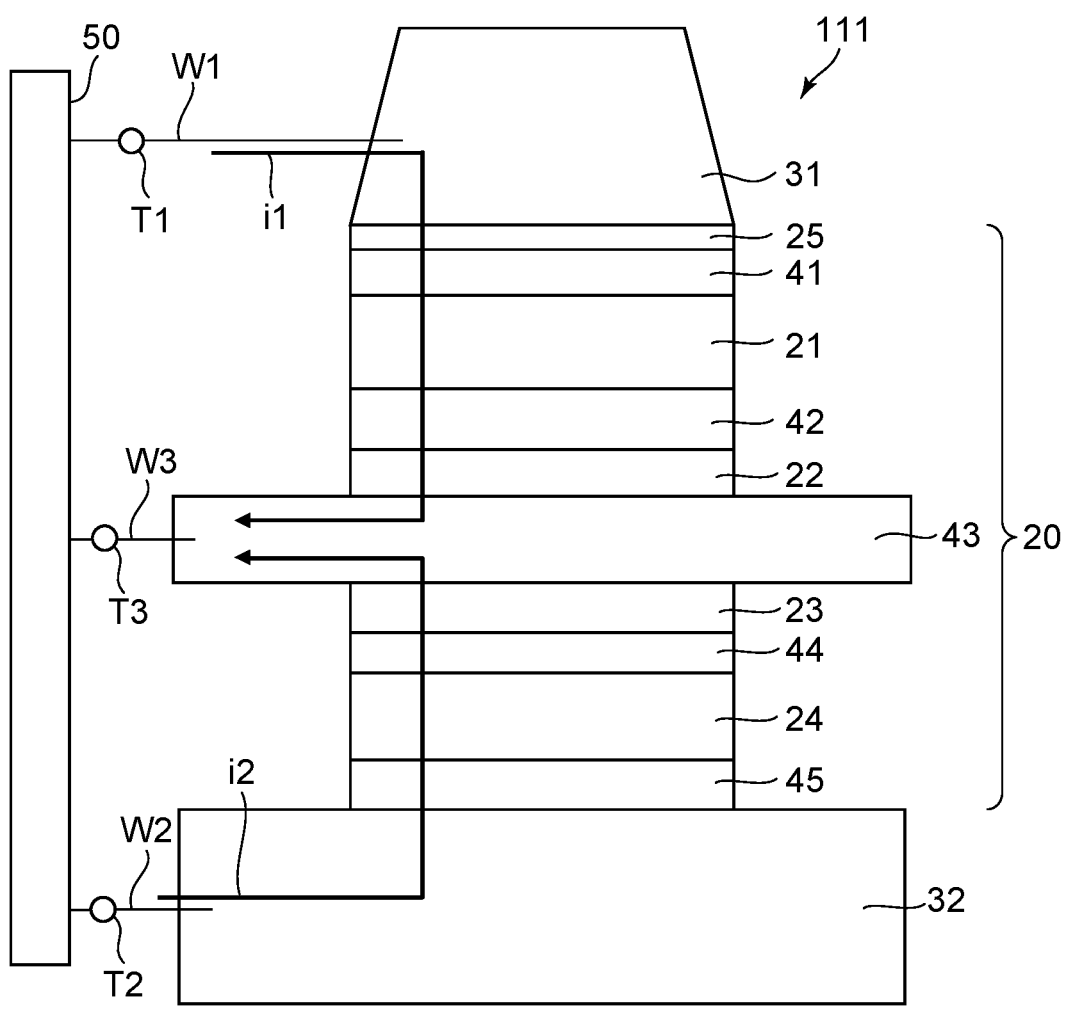
FIG. 4 is a schematic plan view illustrating the magnetic head according to the first embodiment.

FIG. 4 is a schematic plan view illustrating the magnetic head according to the first embodiment.

As shown in FIG. 4, in a magnetic head 111 according to the embodiment, the stacked body 20 further includes a fifth magnetic layer 25. The fifth magnetic layer 25 is provided between the first magnetic pole 31 and the first nonmagnetic layer 41. Except for this, the configuration of the magnetic head 111 may be the same as the configuration of the magnetic head 110.

The fifth magnetic layer 25 includes, for example, at least one selected from the group consisting of Fe, Co and Ni. By providing the fifth magnetic layer 25, for example, high spin injection efficiency can be easily obtained. This facilitates the oscillation. The fifth magnetic layer 25 may be regarded as a part of the first magnetic pole 31.

Figure 5:
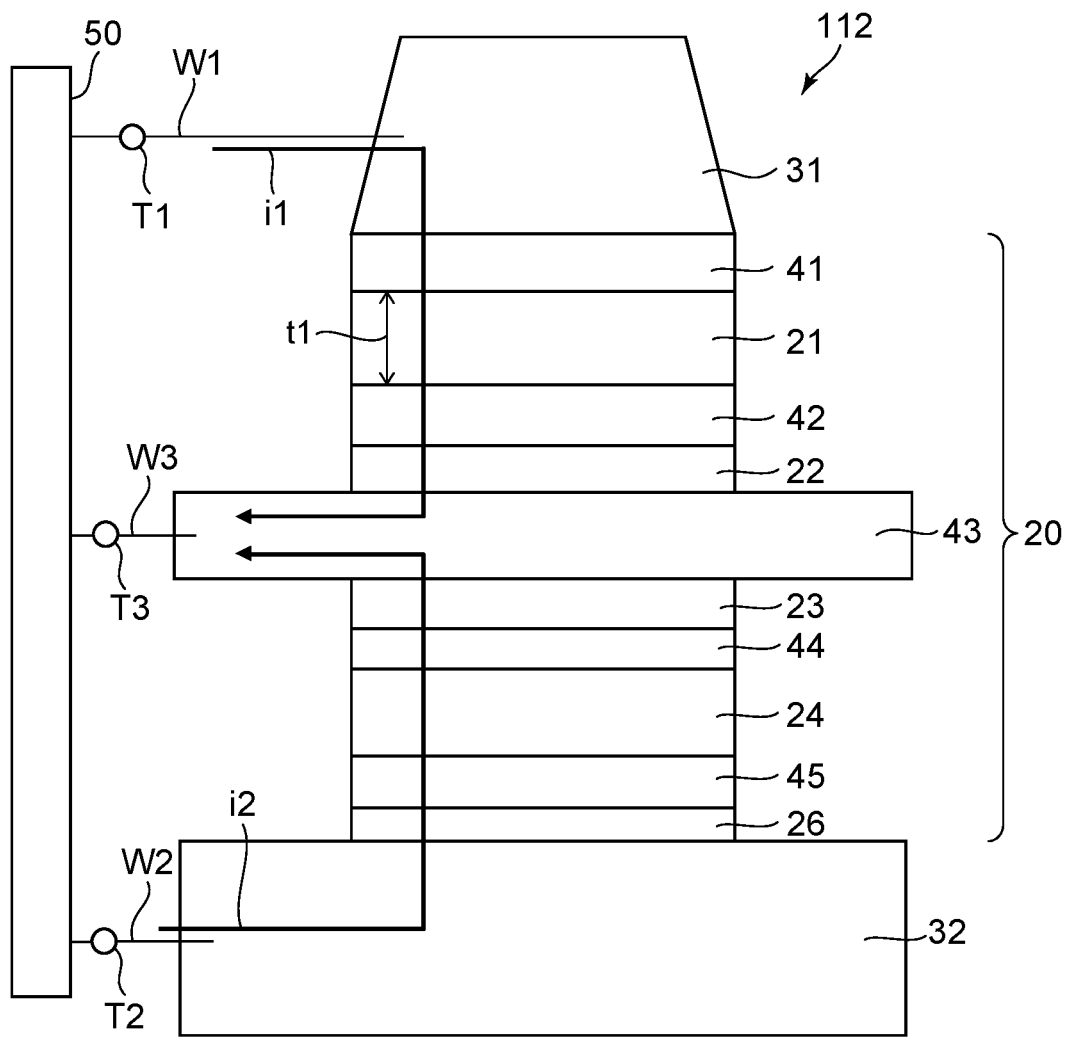
FIG. 5 is a schematic plan view illustrating the magnetic head according to the first embodiment.

FIG. 5 is a schematic plan view illustrating the magnetic head according to the first embodiment.

As shown in FIG. 5, in a magnetic head 112 according to the embodiment, the stacked body 20 further includes a sixth magnetic layer 26. The sixth magnetic layer 26 is provided between the fifth nonmagnetic layer 45 and the second magnetic pole 32. Except for this, the configuration of the magnetic head 112 may be the same as the configuration of the magnetic head 110.

The sixth magnetic layer 26 includes, for example, at least one selected from the group consisting of Fe, Co and Ni. By providing the sixth magnetic layer 26, for example, high spin injection efficiency can be easily obtained. This facilitates the oscillation. The sixth magnetic layer 26 may be regarded as a part of the second magnetic pole 32. In the embodiment, both the fifth magnetic layer 25 and the sixth magnetic layer 26 may be provided.

In the embodiment, at least one of the plurality of magnetic layers (for example, the first to sixth magnetic layers 21 to 26) included in the stacked body 20 may include a film having a uniform composition. In embodiments, at least one of the plurality of magnetic layers (for example, the first to sixth magnetic layers 21 to 26, etc.) included in the stacked body 20 may include stacked films. In the stacked films, for example, a film including a first element and a film including a second element are alternately provided along the first direction D1. For example, the first element includes, for example, one selected from the group consisting of Fe, Co and Ni. For example, the second element includes another one selected from the group consisting of Fe, Co and Ni.

In the embodiment, at least one of the plurality of nonmagnetic layers (for example, the first to fifth nonmagnetic layers 41 to 45) included in the stacked body 20 may include a film having a uniform composition. In the embodiment, at least one of the plurality of nonmagnetic layers (for example, the first to fifth nonmagnetic layers 41 to 45) included in the stacked body 20 may include stacked films. In the stacked films in the first nonmagnetic layer 41, the second nonmagnetic layer 42, the fourth nonmagnetic layer 44 and the fifth nonmagnetic layer 45, for example, a film including a third element and a film including a fourth element are alternately provided along the first direction D1. For example, the third element includes, for example, one selected from the group consisting of Cu, Au, Cr, Al, V and Ag. For example, the fourth element includes another one selected from the group consisting of Cu, Au, Cr, Al, V and Ag.

In the stacked films in the third nonmagnetic layer 43, for example, a film including a fifth element and a film including a sixth element are alternately stacked along the first direction D1. For example, the fifth element includes, for example, one selected from the group consisting of Ta, Pt, Ir, W, Mo, Cr, Tb, Rh, Pd and Ru. For example, the sixth element includes another one selected from the group consisting of Ta, Pt, Ir, W, Mo, Cr, Tb, Rh, Pd and Ru.

Second Embodiment

The second embodiment relates to a magnetic recording device. As already described with respect to FIG. 1, the magnetic recording device 210 according to the embodiment includes a magnetic head (for example, a magnetic head 110 or the like) according to the first embodiment and a controller 50. The controller 50 is electrically connected to the first terminal T1, the second terminal T2, and the third terminal T3. As described above, the controller 50 is configured to supply the first current i1 from the first terminal T1 to the third terminal T3, and the second current i2 from the second terminal T2 to the third terminal T3.

Figure 6:
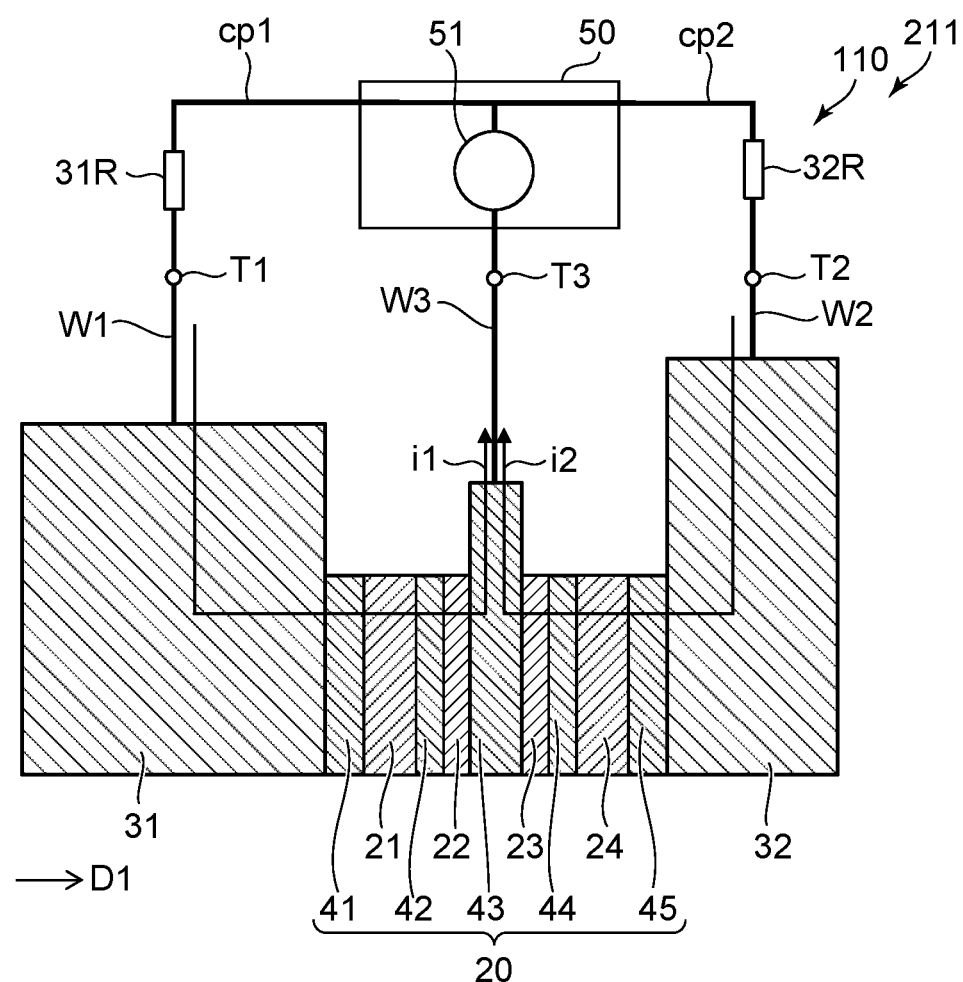
FIG. 6 is a schematic diagram illustrating a magnetic recording device according to a second embodiment.

FIG. 6 is a schematic diagram illustrating the magnetic recording device according to the second embodiment.

As shown in FIG. 6, in a magnetic recording device 211 according to the embodiment, the controller 50 includes a first circuit 51. The first circuit 51 is configured to supply the first current i1 and the second current i2 to the magnetic head (for example, the magnetic head 110). The first circuit 51 may include, for example, a current supply circuit. The first circuit 51 may include a voltage generation circuit.

In this example, the controller 50 includes a resistance element. The resistance element includes, for example, at least one of the first resistance element 31R or the second resistance element 32R. For example, the first resistance element 31R is provided in the first current path cp1 between the first circuit 51 and the first terminal T1. The first resistance element 31R may be provided in series or in parallel. For example, the second resistance element 32R is provided in the second current path cp2 between the first circuit 51 and the second terminal T2. The second resistance element 32R may be provided in series or in parallel.

With these resistances, the first current i1 and the second current i2 can be adjusted. The resistance element may be provided in at least one of the first current path cp1 between the first circuit 51 and the first terminal T1, or the second current path cp2 between the first circuit 51 and the second terminal T2.

Figure 7:
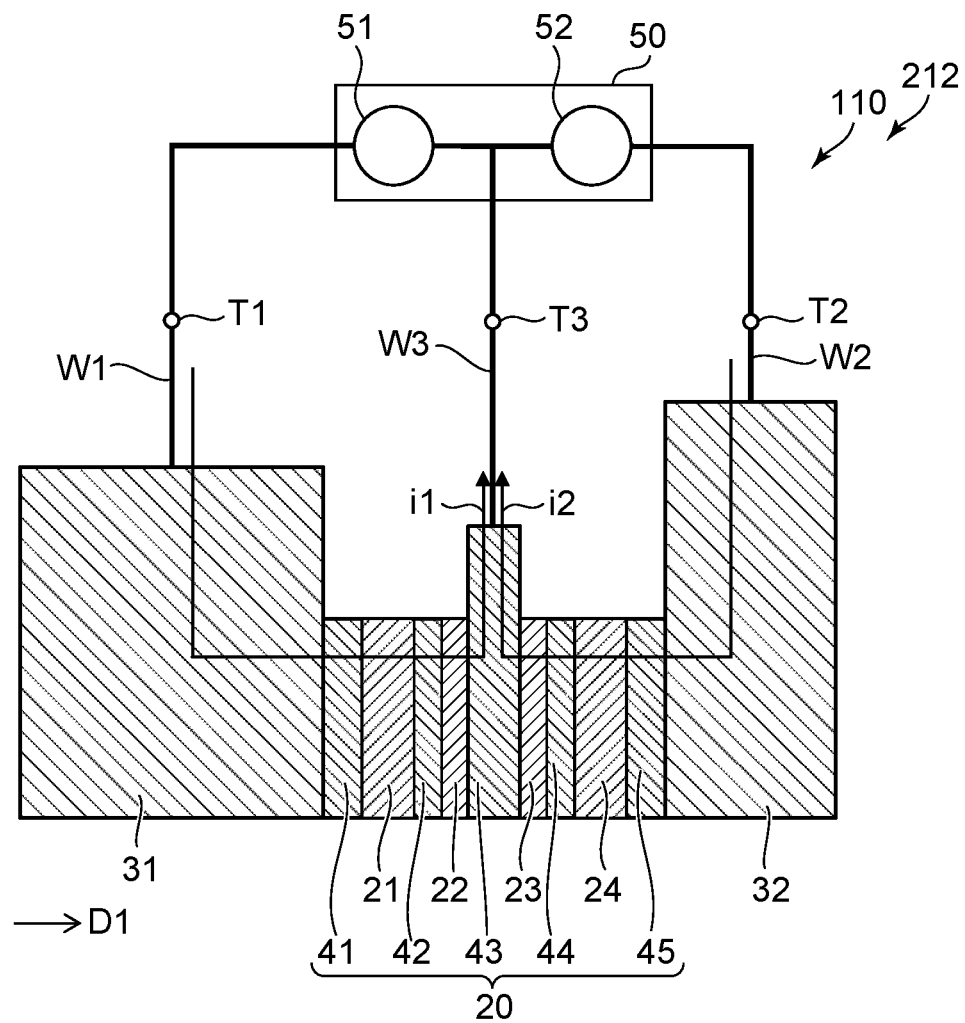
FIG. 7 is a schematic diagram illustrating the magnetic recording device according to the second embodiment.

FIG. 7 is a schematic diagram illustrating the magnetic recording device according to the second embodiment.

As shown in FIG. 7, in a magnetic recording device 212 according to the embodiment, the controller 50 includes the first circuit 51 and the second circuit 52. The first circuit 51 is configured to supply the first current i1 to the magnetic head (for example, the magnetic head 110). The second circuit 52 is configured to supply the second current i2 to the magnetic head (for example, the magnetic head 110). The currents can be adjusted arbitrarily by the two circuits.

The configuration of the first circuit 51, the second circuit 52, the first resistance element 31R and the second resistance element 32R can be applied to any magnetic head according to the first embodiment.

Figure 8A:
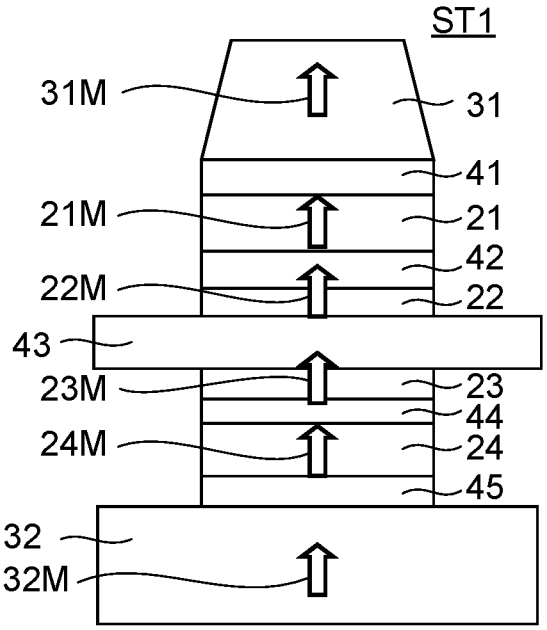
FIGS. 8A to 8C are schematic views illustrating the operation of the magnetic head.
Figure 8B:
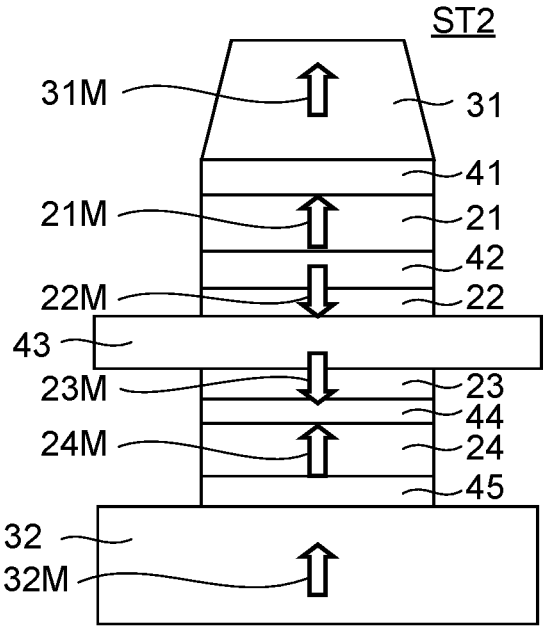
Figure 8C:
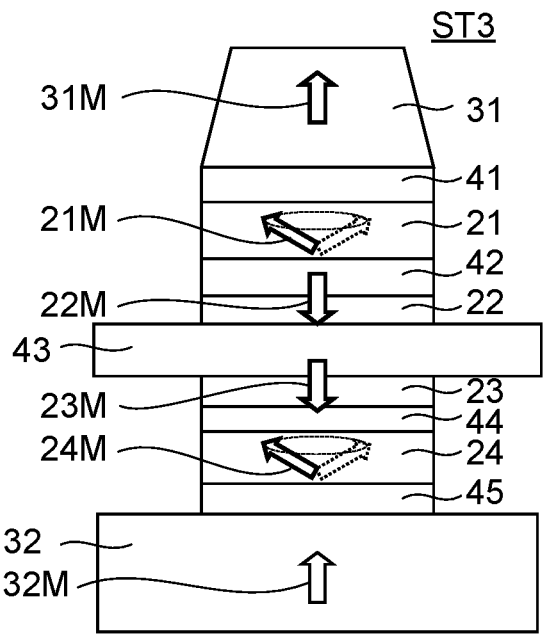

FIGS. 8A to 8C are schematic views illustrating the operation of the magnetic head.

FIG. 8A corresponds to a first state ST1. In the first state ST1, the first current i1 and the second current i2 do not substantially flow. Alternatively, the first current i1 and the second current i2 are less than a first threshold value. FIG. 8B corresponds to a second state ST2. In the second state ST2, the first current i1 and the second current i2 are substantially equal to or more than the first threshold value and less than a second threshold value. FIG. 8C corresponds to a third state ST3. In the third state ST3, the first current i1 and the second current i2 are equal to or higher than the second threshold value.

As shown in FIG. 8A, in the first state ST1, the orientation of the magnetization (magnetization 21M to 24M) of the magnetic layer is the orientation of the magnetization 31M of the first magnetic pole 31 and the magnetization 32M of the second magnetic pole 32. As shown in FIG. 8B, in the second state ST2, the magnetization 22M of the second magnetic layer 22 and the magnetization 23M of the third magnetic layer 23 are inverted. As shown in FIG. 8C, in the third state ST3, the magnetization 21M of the first magnetic layer 21 and the magnetization 24M of the fourth magnetic layer 24 oscillate.

Since the second thickness t2 and the third thickness t3 are thin, the magnetization 22M and the magnetization 23M are efficiently inverted. This makes it possible to reduce the oscillation threshold. Since the first thickness t1 and the fourth thickness t4 are thick, efficient oscillation can be easily obtained.

Hereinafter, an example of the magnetic head and the magnetic recording medium 80 included in the magnetic recording device 210 according to the embodiment will be described.

Figure 9:
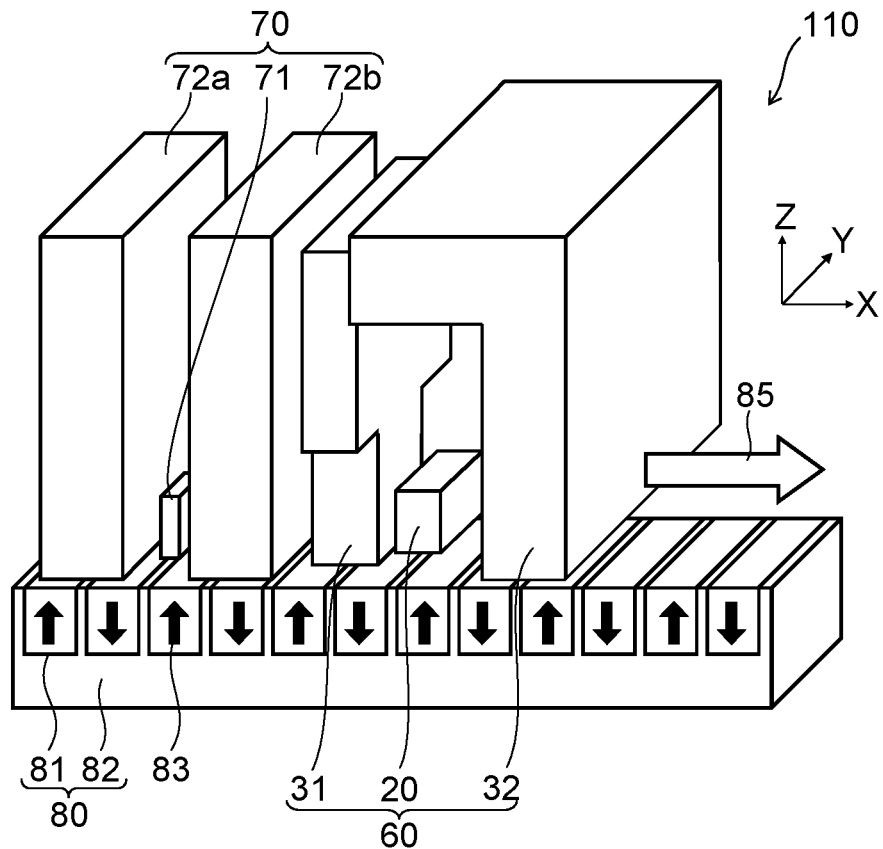
FIG. 9 is a schematic perspective view illustrating the magnetic recording device according to the embodiment.

FIG. 9 is a schematic perspective view illustrating the magnetic recording device according to the embodiment.

As shown in FIG. 9, the magnetic head according to the embodiment (for example, the magnetic head 110) is used together with the magnetic recording medium 80. In this example, the magnetic head 110 includes a recording portion 60 and a reproducing portion 70. Information is recorded on the magnetic recording medium 80 by the recording portion 60 of the magnetic head 110. The reproducing portion 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording portion 60.

The reproducing portion 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal according to the magnetization 83 of the magnetic recording layer 81.

As shown in FIG. 9, the magnetic recording medium 80 moves relative to the magnetic head 110 in the direction of the medium movement direction 85. The magnetic head 110 controls the information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 10:
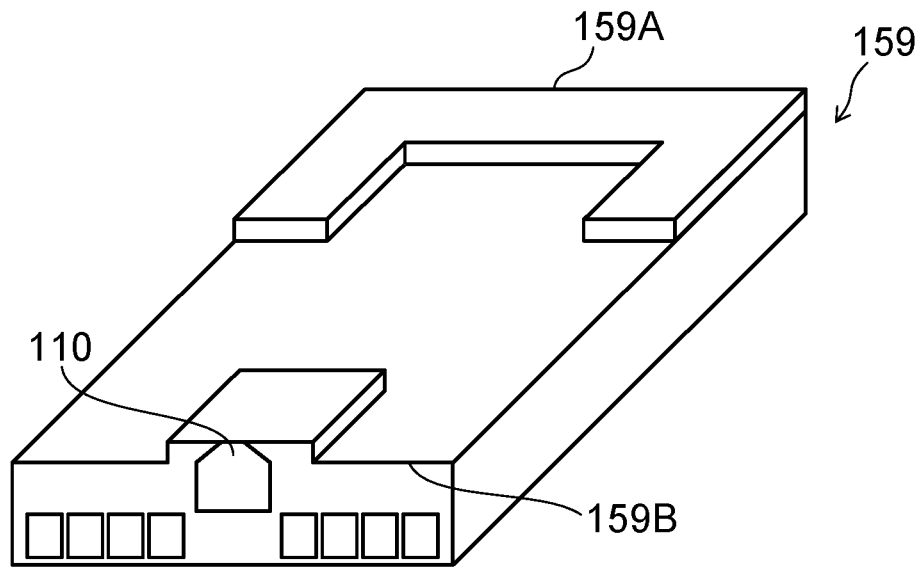
FIG. 10 is a schematic perspective view illustrating a part of the magnetic recording device according to the embodiment.

FIG. 10 is a schematic perspective view illustrating a portion of the magnetic recording device according to the embodiment.

FIG. 10 illustrates a head slider.

The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 11:
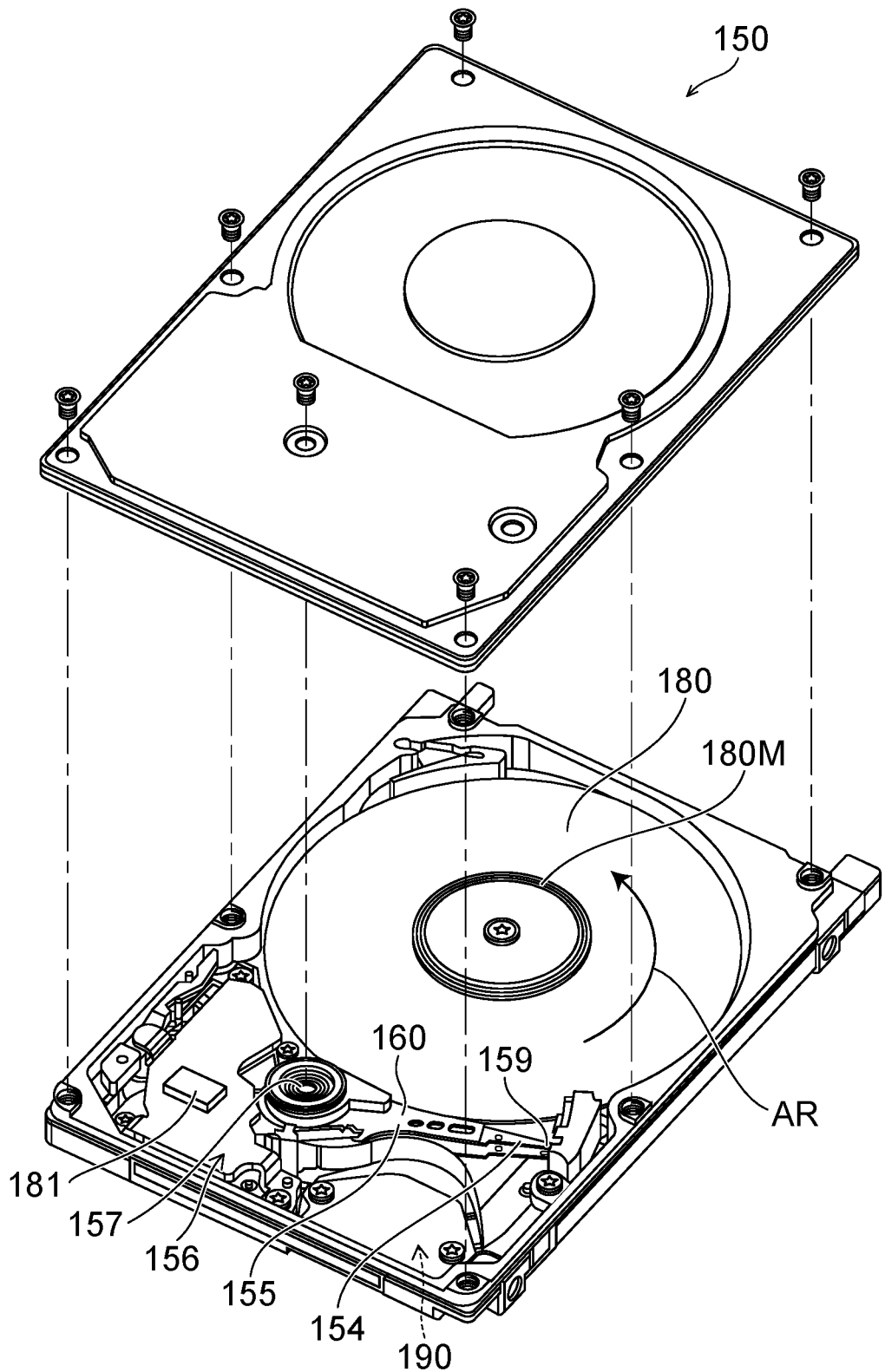
FIG. 11 is a schematic perspective view illustrating the magnetic recording device according to the embodiment.

FIG. 11 is a schematic perspective view illustrating a magnetic recording device according to the embodiment.

As shown in FIG. 11, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, an SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 includes one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

Figure 12A:
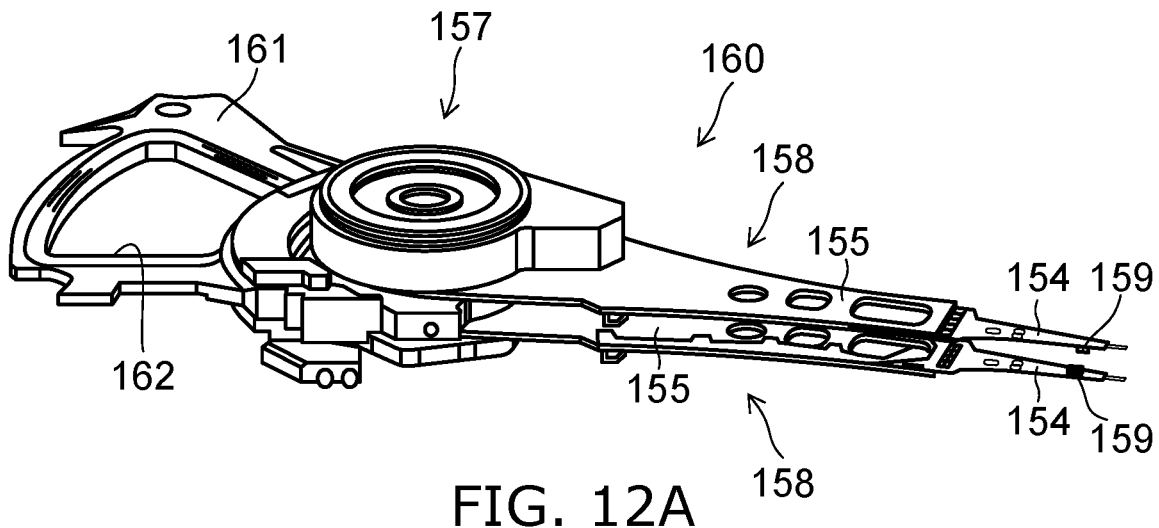
FIGS. 12A and 12B are schematic perspective views illustrating a part of the magnetic recording device according to the embodiment.
Figure 12B:
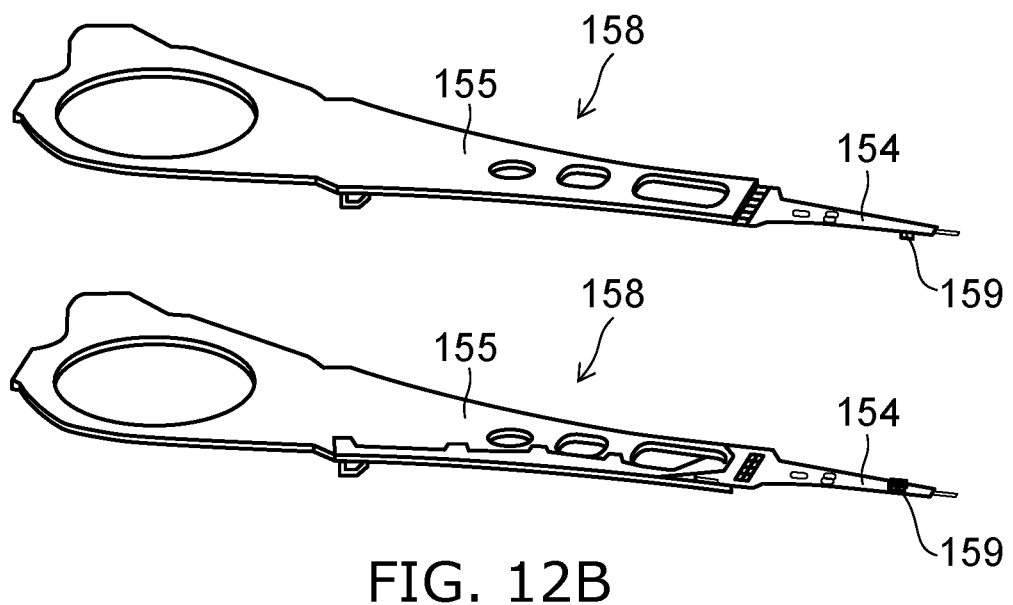

FIGS. 12A and 12B are schematic perspective views illustrating a portion of the magnetic recording device according to the embodiment. FIG. 12A illustrates the configuration of a portion of the magnetic recording device and is an enlarged perspective view of a head stack assembly 160.

FIG. 12B is a perspective view illustrating a magnetic head assembly (a head gimbal assembly (HGA)) 158 that is a portion of the head stack assembly 160.

As shown in FIG. 12A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 12B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin-transfer torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

The embodiments may include the following configurations (e.g., technological proposals).

Configuration 1

A magnetic head, comprising:
a first magnetic pole;
a second magnetic pole;
a stacked body provided between the first magnetic pole and the second magnetic pole, the stacked body including:
a first magnetic layer,
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first nonmagnetic layer provided between the first magnetic pole and the first magnetic layer,
a second nonmagnetic layer provided between the first magnetic layer and the second magnetic layer and being in contact with the first magnetic layer and the second magnetic layer,
a third nonmagnetic layer provided between the second magnetic layer and the third magnetic layer,
a fourth nonmagnetic layer provided between the third magnetic layer and the fourth magnetic layer and being in contact with the third magnetic layer and the fourth magnetic layer, and
a fifth nonmagnetic layer provided between the fourth magnetic layer and the second magnetic pole;
a first terminal electrically connected to the first magnetic pole;
a second terminal electrically connected to the second magnetic pole; and
a third terminal electrically connected to the third nonmagnetic layer.

Configuration 2

The magnetic head according to Configuration 1, wherein
the first nonmagnetic layer is in contact with the first magnetic pole and the first magnetic layer, and
the fifth nonmagnetic layer is in contact with the fourth magnetic layer and the second magnetic pole.

Configuration 3

The magnetic head according to Configuration 1, wherein the stacked body further includes a fifth magnetic layer provided between the first magnetic pole and the first nonmagnetic layer.

Configuration 4

The magnetic head according to Configuration 3, wherein the fifth magnetic layer is in contact with the first magnetic pole.

Configuration 5

The magnetic head according to Configuration 1 or 3, wherein the stacked body further includes a sixth magnetic layer provided between the fifth nonmagnetic layer and the second magnetic pole.

Configuration 6

The magnetic head according to any one of Configurations 1-5, wherein
a first thickness of the first magnetic layer along a first direction from the first magnetic layer to the fourth magnetic layer is thicker than a second thickness of the second magnetic layer along the first direction, and thicker than a third thickness of the third magnetic layer along the first direction, and
a fourth thickness of the fourth magnetic layer along the first direction is thicker than the second thickness and thicker than the third thickness.

Configuration 7

The magnetic head according to Configuration 6, wherein
the first thickness is 1.1 times or more the second thickness, and 1.1 times or more the third thickness, and
the fourth thickness is 1.1 times or more the second thickness, and 1.1 times or more the third thickness.

Configuration 8

The magnetic head according to Configuration 6 or 7, wherein
the first thickness is not less than 5 nm and not more than 15 nm,
the second thickness is not more than 1 nm and less than 5 nm,
the third thickness is 1 nm or more and less than 5 nm, and
the fourth thickness is not less than 5 nm and not more than 15 nm.

Configuration 9
The magnetic head according to any one of Configurations 1-8, wherein at least one of the first nonmagnetic layer, the second nonmagnetic layer, the fourth nonmagnetic layer or the fifth nonmagnetic layer includes at least one selected from the group consisting of Cu, Au, Cr, Al, V and Ag.

Configuration 10
The magnetic head according to any one of Configurations 1-9, wherein the third nonmagnetic layer includes at least one selected from the group consisting of Ta, Pt, Ir, W, Mo, Cr, Tb, Rh, Pd and Ru.

Configuration 11
The magnetic head according to any one of Configurations 1-10, wherein
the third nonmagnetic layer includes a first surface facing the second magnetic layer,
the second magnetic layer includes a second surface facing the third nonmagnetic layer, and
an area of the first surface is larger than an area of the second surface.

Configuration 12
The magnetic head according to any one of Configurations 1-11, wherein
the third nonmagnetic layer includes a third surface facing the third magnetic layer,
the third magnetic layer includes a fourth surface facing the third nonmagnetic layer, and
an area of the third surface is larger than an area of the fourth surface.

Configuration 13
The magnetic head according to any one of Configurations 1-10, wherein
the third nonmagnetic layer includes a first partial region and a second partial region,
the first partial region overlaps the second magnetic layer in a facing direction from the third nonmagnetic layer to the second magnetic layer, and
the second partial region does not overlap the second magnetic layer in the facing direction.

Configuration 14
The magnetic head according to any one of Configurations 1-10, wherein
the third nonmagnetic layer includes a first partial region and a second partial region,
the first partial region overlaps the fourth magnetic layer in a facing direction from the third nonmagnetic layer to the fourth magnetic layer, and
the second partial region does not overlap the fourth magnetic layer in the facing direction.

Configuration 15
The magnetic head according to any one of Configurations 1-10, wherein a length of the third nonmagnetic layer along a crossing direction crossing a facing direction from the third nonmagnetic layer to the fourth magnetic layer is longer than a length of the second magnetic layer along the crossing direction, and longer than a length of the third magnetic layer along the crossing direction.

Configuration 16
A magnetic recording device, comprising:
the magnetic head according to any one of Configurations 1-15; and
a controller electrically connected to the first terminal, the second terminal, and the third terminal,
the controller configured to supply a first current from the first terminal to the third terminal and a second current from the second terminal to the third terminal to the magnetic head.

Configuration 17
The magnetic recording device according to Configuration 16, wherein
the controller includes a first circuit and a resistance element,
the first circuit is configured to supply the first current and the second current to the magnetic head, and
the resistance element is provided in at least one of a first current path between the first circuit and the first terminal, or a second current path between the first circuit and the second terminal.

Configuration 18
The magnetic recording device according to Configuration 16, wherein
the controller includes a first circuit and a second circuit,
the first circuit is configured to supply the first current to the magnetic head, and
the second circuit is configured to supply the second current to the magnetic head.

Configuration 19
The magnetic recording device according to any one of Configurations 16-18, further comprising a third circuit,
the third circuit is configured to supply a recording current to the coil.

Configuration 20
The magnetic recording device according to any one of Configurations 16-19, wherein an alternating magnetic field is generated from the stacked body in response to the first current and the second current.

According to the embodiment, it is possible to provide a magnetic head and a magnetic recording device capable of improving the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, shields, magnetic layers, conductive layers, insulating layers, interconnections, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices, and magnetic heads practicable by an appropriate design modification by one skilled in the art based on the magnetic recording devices, and the magnetic heads described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head; comprising:
a first magnetic pole;
a second magnetic pole;
a stacked body provided between the first magnetic pole and the second magnetic pole, the stacked body including:
a first magnetic layer;
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first nonmagnetic layer provided between the first magnetic pole and the first magnetic layer,
a second nonmagnetic layer provided between the first magnetic layer and the second magnetic layer and being in contact with the first magnetic layer and the second magnetic layer;
a third nonmagnetic layer provided between the second magnetic layer and the third magnetic layer,
a fourth nonmagnetic layer provided between the third magnetic layer and the fourth magnetic layer and being in contact with the third magnetic layer and the fourth magnetic layer, and
a fifth nonmagnetic layer provided between the fourth magnetic layer and the second magnetic pole;
a first terminal electrically connected to the first magnetic pole;
a second terminal electrically connected to the second magnetic pole; and
a third terminal electrically connected to the third nonmagnetic layer,
wherein the stacked body further includes a fifth magnetic layer provided between the first magnetic pole and the first nonmagnetic layer.

2. The head according to claim 1, wherein
the first nonmagnetic layer is in contact with the first magnetic layer, and
the fifth nonmagnetic layer is in contact with the fourth magnetic layer and the second magnetic pole.

3. The head according to claim 1, wherein the fifth magnetic layer is in contact with the first magnetic pole.

4. The head according to claim 1, wherein the stacked body further includes a sixth magnetic layer provided between the fifth nonmagnetic layer and the second magnetic pole.

5. The head according to claim 1, wherein
a first thickness of the first magnetic layer along a first direction from the first magnetic layer to the fourth magnetic layer is thicker than a second thickness of the second magnetic layer along the first direction, and thicker than a third thickness of the third magnetic layer along the first direction, and
a fourth thickness of the fourth magnetic layer along the first direction is thicker than the second thickness and thicker than the third thickness.

6. The head according to claim 5, wherein
the first thickness is 1.1 times or more the second thickness, and 1.1 times or more the third thickness, and
the fourth thickness is 1.1 times or more the second thickness, and 1.1 times or more the third thickness.

7. The head according to claim 5, wherein
the first thickness is not less than 5 nm and not more than 15 nm,
the second thickness is 1 nm or more and less than 5 nm,
the third thickness is 1 nm or more and less than 5 nm, and
the fourth thickness is not less than 5 nm and not more than 15 nm.

8. The head according to claim 1, wherein at least one of the first nonmagnetic layer, the second nonmagnetic layer, the fourth nonmagnetic layer or the fifth nonmagnetic layer includes at least one selected from the group consisting of Cu, Au, Cr, Al, V and Ag.

9. The head according to claim 1, wherein the third nonmagnetic layer includes at least one selected from the group consisting of Ta, Pt, Ir, W, Mo, Cr, Tb, Rh, Pd and Ru.

10. The head according to claim 1, wherein
the third nonmagnetic layer includes a first surface facing the second magnetic layer,
the second magnetic layer includes a second surface facing the third nonmagnetic layer, and
an area of the first surface is larger than an area of the second surface.

11. The head according to claim 1, wherein
the third nonmagnetic layer includes a third surface facing the third magnetic layer,
the third magnetic layer includes a fourth surface facing the third nonmagnetic layer, and
an area of the third surface is larger than an area of the fourth surface.

12. The head according to claim 1, wherein
the third nonmagnetic layer includes a first partial region and a second partial region,
the first partial region overlaps the second magnetic layer in a facing direction from the third nonmagnetic layer to the second magnetic layer, and
the second partial region does not overlap the second magnetic layer in the facing direction.

13. The head according to claim 1, wherein
the third nonmagnetic layer includes a first partial region and a second partial region,
the first partial region overlaps the fourth magnetic layer in a facing direction from the third nonmagnetic layer to the fourth magnetic layer, and
the second partial region does not overlap the fourth magnetic layer in the facing direction.

14. The head according to claim 1, wherein a length of the third nonmagnetic layer along a crossing direction crossing a facing direction from the third nonmagnetic layer to the fourth magnetic layer is longer than a length of the second magnetic layer along the crossing direction, and longer than a length of the third magnetic layer along the crossing direction.

15. A magnetic recording device, comprising:
the magnetic head according to claim 1; and
a controller electrically connected to the first terminal, the second terminal, and the third terminal,
the controller configured to supply a first current from the first terminal to the third terminal and a second current from the second terminal to the third terminal to the magnetic head.

16. The device according to claim 15, wherein
the controller includes a first circuit and a resistance element,
the first circuit is configured to supply the first current and the second current to the magnetic head, and
the resistance element is provided in at least one of a first current path between the first circuit and the first terminal, or a second current path between the first circuit and the second terminal.

17. The device according to claim 16, wherein
the controller includes a first circuit and a second circuit,
the first circuit is configured to supply the first current to the magnetic head, and
the second circuit is configured to supply the second current to the magnetic head.

18. The device according to claim 15, further comprising a third circuit,
the third circuit is configured to supply a recording current to a coil of the magnetic head.

19. The device according to claim 15, wherein an alternating magnetic field is generated from the stacked body in response to the first current and the second current.

20. A magnetic head, comprising:
a first magnetic pole;
a second magnetic pole;
a stacked body provided between the first magnetic pole and the second magnetic pole, the stacked body including:
a first magnetic layer,
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first nonmagnetic layer provided between the first magnetic pole and the first magnetic layer,
a second nonmagnetic layer provided between the first magnetic layer and the second magnetic layer and being in contact with the first magnetic layer and the second magnetic layer,
a third nonmagnetic layer provided between the second magnetic layer and the third magnetic layer,
a fourth nonmagnetic layer provided between the third magnetic layer and the fourth magnetic layer and being in contact with the third magnetic layer and the fourth magnetic layer, and
a fifth nonmagnetic layer provided between the fourth magnetic layer and the second magnetic pole;
a first terminal electrically connected to the first magnetic pole;
a second terminal electrically connected to the second magnetic pole; and
a third terminal electrically connected to the third nonmagnetic layer,
wherein
a first thickness of the first magnetic layer along a first direction from the first magnetic layer to the fourth magnetic layer is thicker than a second thickness of the second magnetic layer along the first direction, and thicker than a third thickness of the third magnetic layer along the first direction, and
a fourth thickness of the fourth magnetic layer along the first direction is thicker than the second thickness and thicker than the third thickness.

21. A magnetic head, comprising:
a first magnetic pole;
a second magnetic pole;
a stacked body provided between the first magnetic pole and the second magnetic pole, the stacked body including:
a first magnetic layer,
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a first nonmagnetic layer provided between the first magnetic pole and the first magnetic layer,
a second nonmagnetic layer provided between the first magnetic layer and the second magnetic layer and being in contact with the first magnetic layer and the second magnetic layer,
a third nonmagnetic layer provided between the second magnetic layer and the third magnetic layer,
a fourth nonmagnetic layer provided between the third magnetic layer and the fourth magnetic layer and being in contact with the third magnetic layer and the fourth magnetic layer, and
a fifth nonmagnetic layer provided between the fourth magnetic layer and the second magnetic pole;
a first terminal electrically connected to the first magnetic pole;
a second terminal electrically connected to the second magnetic pole; and
a third terminal electrically connected to the third nonmagnetic layer,
wherein a length of the third nonmagnetic layer along a crossing direction crossing a facing direction from the third nonmagnetic layer to the fourth magnetic layer is longer than a length of the second magnetic layer along the crossing direction, and longer than a length of the third magnetic layer along the crossing direction.

* * * * *